May 22, 1962  F. M. WILLIAMSON  3,035,857
COUPLINGS FOR FLUID PRESSURE LINES
Filed Oct. 3, 1957
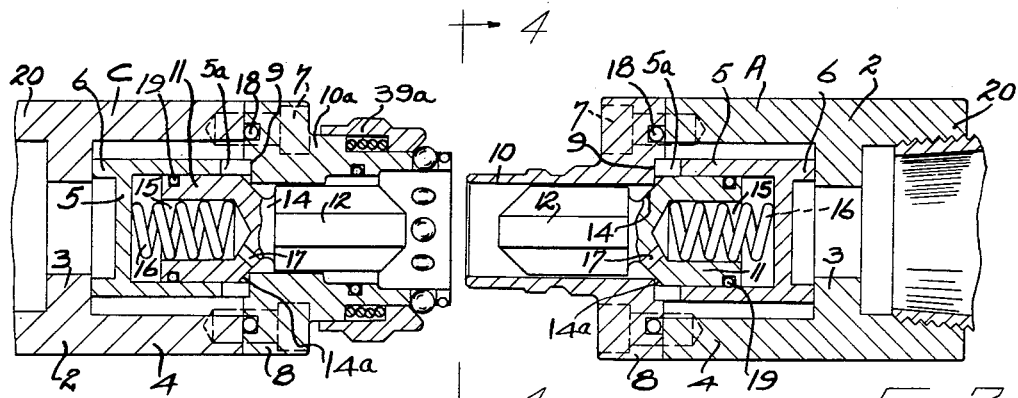
Fig-3-
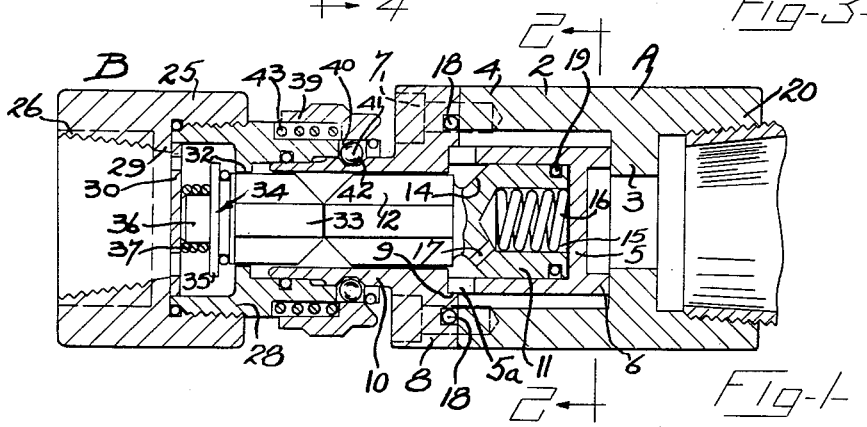
Fig-1-
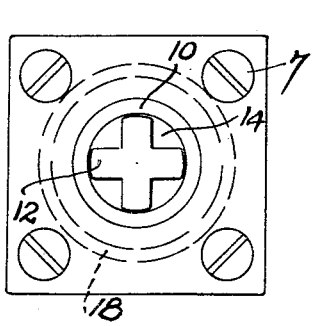
Fig-4-
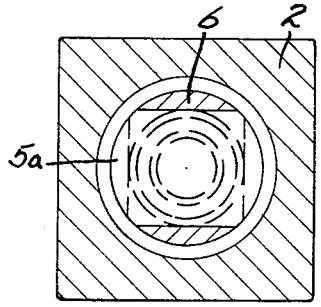
Fig-2-
INVENTOR.
Floyd M. Williamson
BY
Attorney.

United States Patent Office 3,035,857
Patented May 22, 1962

3,035,857
COUPLINGS FOR FLUID PRESSURE LINES
Floyd M. Williamson, 452 Lakewood Ave.,
Detroit 15, Mich.
Filed Oct. 3, 1957, Ser. No. 688,070
8 Claims. (Cl. 284—19)

This invention relates to improvements in couplings for fluid pressure lines. In such couplings it is a common practice to provide a check valve in each coupling portion and to so arrange the valves that fluid under pressure is adapted to flow past them in either direction so long as the said portions are connected to one another. However, the arrangement of the check valves is such that they automatically close and prevent any outward flow from their respective coupling portions when the latter are disconnected, thereby preventing leakage or drip. One of the coupling portions is usually connected to an accumulator or other source of fluid under pressure which remains substantially constant, and the other portion is usually connected to a circuit to be actuated thereby. However there are many conditions under which such a coupling portion cannot be safely connected to a circuit. For instance, if such a coupling portion were provided on a trapped circuit in a press for operating pads in dies, dangerously high pressures would be built up during the closing of the dies prior to their removal from the press, at which time the coacting coupling portions would be disconnected and their check valves would therefore have automatically closed.

It is, therefore, an object of the invention to provide a coupling for fluid pressure lines including coacting portions in each of which a check valve is provided for normally preventing the escape of fluid therefrom when the said portions are disconnected; and wherein automatic means are provided in at least one of the coupling portions for opening the check valve therein if the pressure exerted in that coupling portion exceeds a predetermined amount.

Another object of the invention is to provide such a coupling for fluid pressure lines which is cheap and simple to manufacture, and positive in operation.

With these and other objects and advantages in view which will become apparent as the specification proceeds, the invention is hereinafter more fully described with the aid of the accompanying drawing, in which:

FIGURE 1 is a longitudinal section showing a coupling portion made according to this invention and connected to a conventional coupling portion.

FIGURE 2 is a section on the line 2—2 of FIGURE 1.

FIGURE 3 is a longitudinal section showing two coupling portions made according to this invention and detached from one another.

FIGURE 4 is a view on the line 4—4 of FIGURE 3.

In the drawing, A designates a coupling portion made according to my invention, and includes means for opening the check valve therein when the pressure in the line on which it is secured exceeds a predetermined amount and that coupling portion is detached from the other portion to which it is adapted to be connected. B indicates a conventional coupling portion having a check valve therein but no means for opening the latter when that portion is detached from the coupling portion to which it is adapted to be connected irrespective of the pressure therein. C denotes a slight modification of the coupling portion A, and is also provided with means for opening a check valve therein when a predetermined pressure is exerted therein and that coupling portion is detached from the other coupling portion with which it is adapted to cooperate.

Referring first to the coupling portions A and C; they each include a tubular member 2 having intermediately of its length an inwardly projecting annular collar 3 formed therein. Mounted in one extremity 4 of the tubular member is a dash pot 5 of smaller diameter than the bore of the said extremity. Extending from the closed base of the dash pot 5 and bearing against the adjacent face of the collar 3 are spaced diametrically opposed longitudinal projections 6 by which the dash pot 5 and collar 3 are held spaced from one another to permit fluid to flow freely between them and between the projections 6 from around the dash pot through the collar, or vice versa. Secured upon the outer annular face of the extremity 4 as by screws 7 is an annular flange 8, and formed in the face of the flange adjacent the dash pot is an annular recess 9 to receive forwardly projecting segmental fingers 5a integral with the said dash pot 5. Thus the latter is held immovable in the tubular member 2 by and between the flange 8 and the collar 3 which engage the fingers 5a and the projections 6, respectively. Formed integral with and projecting coaxially outward from the flange 8 is an annular bushing 10 or 10a the bore of which is coaxial with and smaller than that of the dash pot 5. Mounted for axial movement in the latter is a check valve 11 having an integral stem or projection 12 which is non-circular in cross section and is connected to the said valve by a circular neck 14 of decreasing diameter toward the said stem for a portion of its length. This neck forms a seat or valve member to bear against the annular valve seat or shoulder at the inner extremity of the bore of the bushing 10 or 10a.

Extending axially into the extremity of the valve 11 adjacent the base of the dash pot 5 is an opening 15 into which one extremity of a helical spring 16 extends. The opposite end of the spring bears against the base of the dash pot. An aperture 17 is formed substantially radially through the neck 14 of the valve to permit air or other fluid to pass between the outer face of the check valve and the opening 15. The flange 8 and the valve 11 are provided with annular recesses to receive O-rings 18 and 19 to form seals against the annular face of the extremity 4 of the tubular member and the bore of the dash pot 5, respectively. The extremity 20 of the tubular member 2 is provided with any preferred means, such as an internal thread, for attachment to a mechanism (not shown) into which fluid under pressure is to be discharged or from which it is to be allowed to escape.

The conventional coupling B, shown in FIGURE 1, consists in the present instance of an annular member 25 provided with means such as an internal thread 26 for attachment to a suitable connection (not shown) through which fluid under pressure is adapted to flow from any source, such as an accumulator, not shown. The opposite extremity of the annular member is internally threaded to receive the bushing 28 which projects outwardly therefrom. An annular inwardly projecting collar 29 is formed in the bore of the member 25 intermediately of its length, and supported between the inner extremity of the bushing 28 and the adjacent face of the collar 29 is a perforated disc 30. Formed also in the bushing 28 intermediately of its length is an internal annular flange 32 through which the non-circular stem 33 of a check valve 34 is adapted to slide. Projecting around the inner extremity of the valve stem 33 and integral therewith is an annular flange 35, and extending between the latter and the disc 30 is a shank 36. 37 denotes a helical spring mounted around the shank 36 between the disc 30 and the flange 35 by which the check valve 34 is outwardly urged.

Outwardly of the flange 32 the bore of the bushing 28 is enlarged to receive the outer extremity of the bushing 10. These bushings 10 and 28 are held in engagement with one another in the present instance by a conventional retaining collar 39 which is axially slidable upon the outer extremity of the bushing 28. Formed radially through the latter are apertures 40 through which balls 41 are inserted into an annular groove 42 formed in the outer periphery of the bushing 10. The bore of the rear portion of the collar 39 is of increased diameter and the rear portion of the outer periphery the bushing 28 is of reduced diameter, thereby forming an annular space between them in which a spring 43 is mounted to urge the collar 39 forward and retain the balls 41 in position.

From the foregoing it will be readily seen that when the coupling portions A and B are in engagement with one another as shown in FIGURE 1, the stems or projections 12 and 33 of the check valves 11 and 34, respectively, force each other inwardly. Then the annular flange or valve member 35 of the check valve 34 is spaced from the flange or seat 32, and the circular neck 14 of the check valve 11 is held spaced from the adjacent extremity of the bore of the bushing 10. Consequently fluid under pressure may pass freely in either direction through the coupling portions. However when the latter are detached from one another, by sliding the collar 39 inwardly and releasing the balls 41, then the flange 35 seats against the flange 32 on account of the pressure exerted by the spring 37, and the neck 14 on the valve 11 is seated against the adjacent extremity of the bore of the bushing 10 by the spring 16. Moreover in the case of the coupling portion B irrespective of the pressure of the fluid discharged thereinto through the internally threaded portion 26 of the annular member 25 the check valve remains closed when that portion is disconnected. In the case of the coupling portion A, however, if fluid under excessive pressure flows into the tubular member 2 through the extremity 20 it passes through the collar 3 and between the projections 6 into the annular space around the dash pot 5 to exert pressure against the outer peripheral portion 14a of the neck of the check valve 11 which extends outwardly beyond the shoulder forming the valve seat on bushing 10. When pressure exerted against the surface 14a overcomes the resistance of the spring 16 then the valve 11, 10 functions as a pressure relief valve and member 11 is moved from its position shown in FIGURE 3 toward that shown in FIGURE 1, so that the valve member 14 is no longer seated against the valve seat on bushing 10 and consequently the fluid under pressure escapes through the latter.

Referring now to the coupling portion C shown in FIGURE 3, this is a slight modification of the coupling portion A in that its bushing 10a is relatively somewhat larger than the bushing 10 opposite to it, and the bushing 10a is provided with a conventional retaining collar 39a identical to that illustrated on the coupling portion B in FIGURE 1; though obviously other means may be employed for detachably connecting the coupling portions to one another. It will be immediately seen, therefore, that the check valve 11 in the portion C is so mounted that it functions as a pressure relief valve and automatically opens if excessive pressure is exerted in the said portion when the latter is disconnected from the other coupling portion with which it cooperates.

While in the foregoing the preferred embodiments of the invention have been described and shown it is understood that alterations and modifications may be made thereto provided they fall within the scope of the appended claims.

What I claim is:

1. A coupling for fluid pressure lines including two tubular members, detachable means for operatively securing said members to one another in fluid flow relation, a check valve in each member, an annular seat in each member for the valve therein, means in each member for urging the valve therein against its seat, at least one of the check valves having an effective outer peripheral surface responsive to excess pressure fluid retained by said valve when closed whereby fluid pressure in excess of a predetermined amount exerted against said effective surface will unseat the valve and permit the release of pressure fluid when said tubular members are uncoupled, and means on the valves for unseating one another and permitting a fluid flow in either direction through said members when said members are connected to one another.

2. In a coupling for fluid pressure lines, a pair of coupling fittings for the ends of said lines to be coupled including a tubular member for at least one of said coupling fittings, a dash pot mounted therein, said dash pot being spaced from said tublular member so that a passage is formed past it for the flow of fluid from one extremity of the member to the other, a bushing projecting from the extremity of the member adjacent the open end of the dash pot, a check valve supported for axial movement in the dash pot adapted to seat against the adjacent extremity of the bushing, spring means urging the check valve against the bushing, an annular projection extending from the valve radially around the bushing to provide a surface responsive to excess pressure fluid whereby liquid pressure in excess of a predetermined amount in the tubular member is adapted to unseat the valve and permit pressure fluid to escape from the member when said coupling fittings are in an uncoupled position, a second tubular member in the other coupling fitting, detachable means for connecting the tubular coupling members to one another, and means in the second tubular member arranged to engage said check valve for unseating the check valve in the first named member when the two members are connected to one another.

3. A coupling for fluid pressure lines including two tubular members adapted to be coupled together, a valve seat in each member, a check valve in each member, a spring in each member tending to retain the valve therein against its seat, the check valve in at least one tubular member having an annular projection extending circularly around its seat to provide an effective surface responsive to excess pressure fluid whereby fluid under pressure in excess of a predetermined amount in the tubular member is adapted to unseat the valve when said tubular members are uncoupled, a valve stem extending from each check valve, and detachable means on the tubular members for connecting them to one another whereby the stems engage one another and force the valves off their seats to permit a free flow of fluid in either direction through the coupling when said tubular members are in coupled relation.

4. In a coupling for fluid pressure lines, two tubular members adapted to be detachably connected one to the other in axial alignment, a dash pot mounted in each member in spaced relation therewith to form a passage for the flow of fluid from one extremity of that member to the other, a bushing projecting outwardly from the extremity of each tubular member adjacent the open end of the dash pot therein, a check valve slidable in each dash pot adapted to seat against the bushing adjacent thereto, a stem on each valve slidable in the bushing adjacent thereto, means in each dash pot for urging the check valve therein into engagement with the adjacent bushing, each check valve being connected to its stem by a tapered neck of decreasing diameter toward said stem to provide a surface responsive to fluid pressure whereby fluid under pressure exceeding a predetermined amount exerted against the neck is adapted to unseat the check valve when said tubular members are disconnected, and detachable means for holding the outer extremities of the bushings in aligned engagement whereby the valves are adapted to be forced inwardly against one another to unseat each other from the extremities of the bushings and permit unrestricted flow through the tubular members.

5. A coupling for fluid pressure lines comprising two tubular members, detachable means for securing the outer ends of the members one to the other, one of the members having an annular valve seat for the passage of fluid therethrough, a check valve in said tubular member arranged to seat on said valve seat, a spring reacting on said valve to seat the same when said tubular members are disconnected, means carried by the other tubular member for unseating said valve when the members are connected in coupling relation, and means in the first named tubular member responsive to excess pressure fluid to which said check valve is subjected whereby said valve will be unseated when the pressure of such fluid exceeds a predetermined amount.

6. A quick detachable pipe coupling having opposed coupling elements, means for operatively connecting said elements in fluid flow relation, a normally closed relief valve in one coupling element comprising a seat and a valve member cooperable with said seat to close said valve when said elements are disconnected, a projection on the downstream side of said relief valve member cooperable with the opposite coupling element to unseat said valve member and open the relief valve when said coupling elements are operatively connected, said relief valve having means responsive to pressure fluid in excess of a predetermined pressure on the side of said valve opposite said projection for opening said valve to permit the escape of excessive pressure fluid when the coupling elements are uncoupled.

7. A quick detachable pipe coupling, comprising two coupling elements, means for operatively connecting said elements in fluid flow relation, a spring biased normally closed check valve in one of said coupling elements comprising a seat and a valve member cooperable with said seat to close said valve when said elements are disconnected, a projection on said valve member cooperable with the opposite coupling element to unseat said valve member and open said check valve when said coupling elements are operatively connected together, said check valve having means responsive to pressure fluid in excess of a predetermined amount on the upstream side of the valve when said coupling elements are disconnected to unseat said valve member and thereby open said check valve to permit the escape of pressure fluid.

8. A quick detachable pipe coupling comprising two coupling elements, means for operatively connecting said elements in fluid flow relation, a normally closed check valve in one coupling element comprising a seat and a valve member cooperable with said seat to close said valve when said elements are disconnected, means to unseat said valve when said coupling elements are operatively connected, and an effective surface on said check valve exposed to and responsive to pressure fluid in excess of a predetermined amount on the upstream side of the valve to which said valve is subjected to unseat said valve member and thereby open said valve when the coupling elements are uncoupled.

References Cited in the file of this patent

UNITED STATES PATENTS

| | | |
|---|---|---|
| 2,218,318 | Pfauser | Oct. 15, 1940 |
| 2,453,741 | Bopp | Nov. 16, 1948 |
| 2,678,834 | Courtot | May 18, 1954 |